United States Patent Office 3,720,582
Patented Mar. 13, 1973

3,720,582
PREPARATION OF NORADRENALINE
Michael Harry Barnes, Rickmansworth, England, assignor to United Kingdom Atomic Energy Authority, London, England
No Drawing. Filed July 20, 1970, Ser. No. 56,754
Claims priority, application Great Britain, July 24, 1969, 37,376/69
Int. Cl. C12d 13/02
U.S. Cl. 195—30     5 Claims

ABSTRACT OF THE DISCLOSURE

A process for the preparation of noradrenaline which comprises reacting hydrogen cyanide with 3,4-diacetoxybenzaldehyde in the presence of an enzyme to produce a cyanohydrine which is then reduced and deacetylated to give dl-noradrenaline.

BACKGROUND OF THE INVENTION

The present invention relates to the preparation of noradrenaline.

It is known that noradrenaline, otherwise known as arterenol, is a naturally occurring drug in the suprarenals; it is in fact 1-(3,4-dihydroxyphenyl)-2-aminoethanol. In nature it occurs as the laevorotatory isomer. The material has been synthesised and the synthesis of the racemate and its resolution are described in K. R. Payne, Industrial Chemist, 37 (441), November 1961, pp. 523–527.

It is a primary object of the present invention to provide a new or improved route for the synthesis of noradrenaline.

Biochemical compounds which are "labelled," i.e. contain one or more radioactive atoms per molecule, are well known and have the prime function of being usable in biochemical investigations into the mechanism of action of the unlabelled or natural compound. The route of the present invention is particularly, but not exclusively, useful in the preparation of C–14 labelled noradrenaline.

SUMMARY OF THE INVENTION

According to the present invention there is provided a process for the preparation of noradrenaline which comprises reacting hydrogen cyanide with 3,4-diacetoxybenzaldehyde in the presence of an enzyme to produce a cyanohydrin which is then reduced and deacetylated to give dl-noradrenaline.

In the preparation of the labelled compound potassium cyanide-C14 is used and the noradrenaline is labelled in the 2-position.

The reduction is preferably carried out using diborane, but lithium aluminium hydride may be used.

The enzyme used is preferably hydroxy-nitrile lyase in solution.

It is convenient to set out the above described reactions as follows:

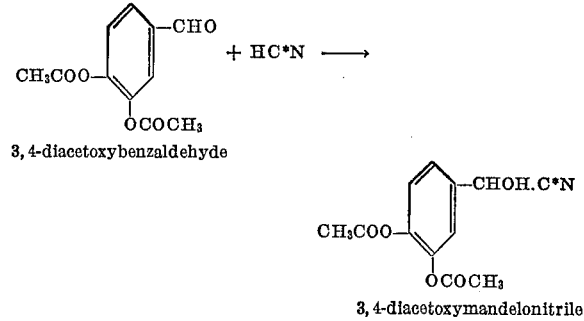
3,4-diacetoxybenzaldehyde 3,4-diacetoxymandelonitrile

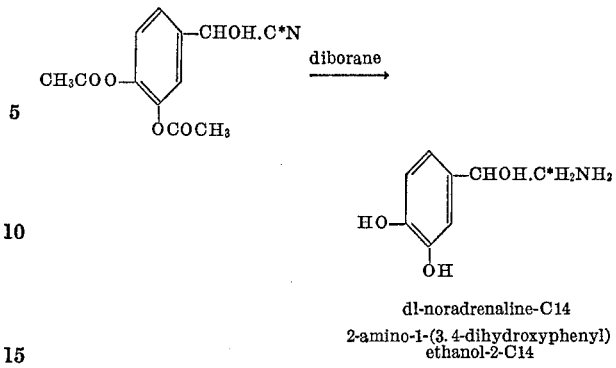

dl-noradrenaline-C14
2-amino-1-(3,4-dihydroxyphenyl) ethanol-2-C14

It will be appreciated that, if it can conveniently be carried out, resolution of the racemate is desirable. In the case of the inactive compound, which may be made on a large scale, it is conventional to effect this by recrystallisation using d-tartaric acid in methanol but this is difficult to effect below the 100 g. scale. On the milligram scale (as is used for labelled compounds) we prefer to use (—)-2-phenylpropionic acid as the diastereoisomeric salts obtained are much less soluble than the tartrates. The final product is, however, conveniently the bitratrate for physiological reasons.

In order that the present invention may more readily be understood, the preperation of l-noradrenaline-C14 bitartrate will now be described in detail with reference to a tracer scale preparation.

Preparation of 3,4-diacetoxymandelonitrile-C14

Hydrogen cyanide-C14 gas is prepared using a vacuum manifold system by reacting potassium cyanide-C14 (263 mg., 4.05 mmole) with an excess of n-octanoic acid. The hydrogen cyanide-C14 is condensed into a reaction vessel, and the following reagents are added: 50% ethanolic 0.05M acetate buffer, pH 5.4 (2 ml.); 3,4-diacetoxybenzaldehyde (909 mg., 4.1 mmole) dissolved in 20 ml. of the same buffer; 5 ml. of an extract of the enzyme D-hydroxynitrile lyase (4.1.2.10); and 5 ml. of ethanol. After 3 hours at room temperature the reaction mixture is diluted with water and extracted three times with ethyl acetate (50 ml. each). The combined ethyl acetate layers are washed with water, dried and evaporated under reduced pressure, leaving a pale yellow oil, 1.01 g. Radiochemical yield 65–70%.

Preparation of dl-noradrenaline-C14

Diborane is generated in a vacuum manifold system by adding a mixture of boron trifluoride etherate (2.25 ml.) in diglyme, i.e. diethylene glycol dimethyl ether, (10 ml.) to a stirred solution of sodium borohydride (691 mg.) in diglyme (15 ml.). The diborane is condensed into a flask containing a solution of the above 3,4-diacetoxymandelo-nitrile-C14 in tetrahydrofuran (45 ml.). The mixture is allowed to warm up and is vigorously shaken at room temperature for 3½ hours. The solvent is removed under reduced pressure, and water (20 ml.) containing enough dilute hydrochloric acid to acidify the mixture and ether (approx. 40 ml.) are added. The layers are separated, and the aqueous layer washed again with ether. The combined ether extracts are washed with water (10 ml., then 5 ml.) and the three aqueous layers are combined, evaporated to dryness at 40° C. and 1 torr and dried in vacuo over phosphorus pentoxide overnight.

The residue is treated with methanol (50 ml.) which is removed under reduced pressure at 40°. This process is repeated four times. The gummy residue is applied to eight sheets of preparative chromatographiy paper, which are developed overnight with n-butanol:water:acetic acid (12:5:3; all solvents are previously boiled, and cooled by bubbling nitrogen through them). The papers are dried and autoradiographed, and the main radioactive band (Rf approximately 0.4) cut out and eluted overnight with water containing a little mercaptoethanol. The eluate is concentrated to dryness at 40° C. and 1 torr, and the residue is taken up in 3 ml. of water. The solution is cooled in ice-water and concentrated ammonia (approximately twelve drops) is added. After 5 mins. the buff-coloured powder is collected by filtration, washed with ice-cold water (1 ml.), ethanol (1 ml.) and ether (several mls.) and dried in vacuo at 50°. Yield 231 mg., approximately 34% from potassium cyanide.

Resolution of dl-noradrenaline-C14

To the dl-noradrenaline-C14 referred to above is added (—)-2-phenylpropionic acid (209 mg.) and the mixture is recrystallised from the minimum amount of water (approximately 2 ml.) overnight. The crystals are collected by filtration, washed with a few drops of water, and recrystallised twice more from the minimum amount of water, yielding 83.2 mg., 19% yield on the resolution.

For the purposes of analysis and storage, the material is converted into the d-bitartrate monohydrate as follows. The l-noradrenaline-C14 (—)-2-phenylpropionate is dissolved in warm water and an equivalent of d-tartaric acid is added. The mixture is extracted twice with ether (20 ml.). The combined ethereal layers are washed with water and the combined aqueous layers are treated for 1½ hours at room temperature with a few mgs. of charcoal. The charcoal is removed by filtration and the aqueous layer is freeze-dried, a fluffy, slightly pink solid being obtained. The recovery is almost quantitative.

The radiochemical purity of the product (by dilution analysis with l-noradrenaline d-bitartrate monohydrate B.P.) is 99%. The optical rotation has the value $(\alpha)_D = -10°$ to $11°$ (water). The overall radiochemical yield from potassium cyanide is approximately 6%.

I claim:
1. A process for the preparation of noradrenaline which comprises reacting hydrogen cyanide with 3,4-diacetoxybenzaldehyde in the presence of hydroxy-nitrile lyase enzyme to produce a cyanohydrin which is then reduced and deacetylated to give dl-noradrenaline.
2. A process as claimed in claim 1, wherein C-14 labelled dl-noradrenaline is prepared using potassium cyanide-C14, the noradrenaline being labelled in the 2-position.
3. A process as claimed in claim 1, wherein the reduction is carried out using diborane.
4. A process as claimed in claim 1, wherein the reduction is carried out using lithium aluminium hydride.
5. A process as claimed in claim 1, wherein the enzyme used is in solution.

References Cited

Bové, et al., The Journal of Biological Chemistry, vol. 236, No. 1, pp. 207–210 (1961).

ALVIN E. TANENHOLTZ, Primary Examiner

U.S. Cl. X.R.

195—28 R